(12) United States Patent
Viswanathan et al.

(10) Patent No.: US 7,328,306 B1
(45) Date of Patent: Feb. 5, 2008

(54) FLEXIBLE DISABLING OF DISK SETS

(75) Inventors: Srinivasan Viswanathan, Fremont, CA (US); Douglas P. Doucette, Freeland, WA (US)

(73) Assignee: Network Appliance, Inc., Sunnyvale, CA (US)

( * ) Notice: Subject to any disclaimer, the term of this patent is extended or adjusted under 35 U.S.C. 154(b) by 171 days.

(21) Appl. No.: 11/018,940

(22) Filed: Dec. 20, 2004

Related U.S. Application Data

(63) Continuation of application No. 10/084,405, filed on Feb. 25, 2002, now Pat. No. 6,836,820.

(51) Int. Cl.
*G06F 12/00* (2006.01)

(52) U.S. Cl. .............................. 711/114; 711/4; 714/2; 714/42

(58) Field of Classification Search ................. 711/114
See application file for complete search history.

(56) References Cited

U.S. PATENT DOCUMENTS

| | | | |
|---|---|---|---|
| 5,668,991 A | 9/1997 | Dunn et al. | |
| 5,701,450 A * | 12/1997 | Duncan | 712/245 |
| 5,835,694 A | 11/1998 | Hodges | |
| 5,963,962 A | 10/1999 | Hitz et al. | |
| 6,026,402 A | 2/2000 | Vossen et al. | |
| 6,154,853 A | 11/2000 | Kedem | |
| 6,289,356 B1 | 9/2001 | Hitz et al. | |
| 6,836,820 B1 | 12/2004 | Viswanathan et al. | |

FOREIGN PATENT DOCUMENTS

| | | |
|---|---|---|
| DE | 694 25 658 T2 | 8/2000 |
| EP | 0 702 815 B1 | 8/2000 |
| WO | WO 94/29807 A1 | 12/1994 |

OTHER PUBLICATIONS

Gray et al. "Transaction processing: concepts and techniques." 1993, pp. 724-732.
Hutchinson et al. "Logical vs. physical file system backup." Third Symposium on Operating Systems Design and Implementation, Feb. 22-25, 1999, pp. 239-249, New Orleans, LA, USA.
Slashdot. "TUX 2: The FileSystem That Would Be King." Oct. 17, 2000, pp. 1-16, Slashdot.com.

* cited by examiner

*Primary Examiner*—Brian R. Peugh
*Assistant Examiner*—Matthew Bradley
(74) *Attorney, Agent, or Firm*—Blakely Sokoloff Taylor & Zafman LLP

(57) ABSTRACT

The invention provides flexible disabling of disk sets. One or more disks in a RAID sub-system may be identified as temporarily inactive. The disk or disks are then marked as inactive by setting one of a set of bits associated with each disk in the RAID subsystem. If an inactivated disk is a data disk, marking it as inactive also marks it as read only. If an inactivated disk is a parity disk, the RAID group to which it supplies parity is also inactivated and a file system must look to a mirror of the inactivated RAID sub-system for its data. When a data disk is reactivated it is marked as read/write by clearing its associated bit. When a parity disk is reactivated it is also marked as read/write by clearing its bit, however, it is not available for use until it has synchronized its operation with its mirror.

14 Claims, 4 Drawing Sheets

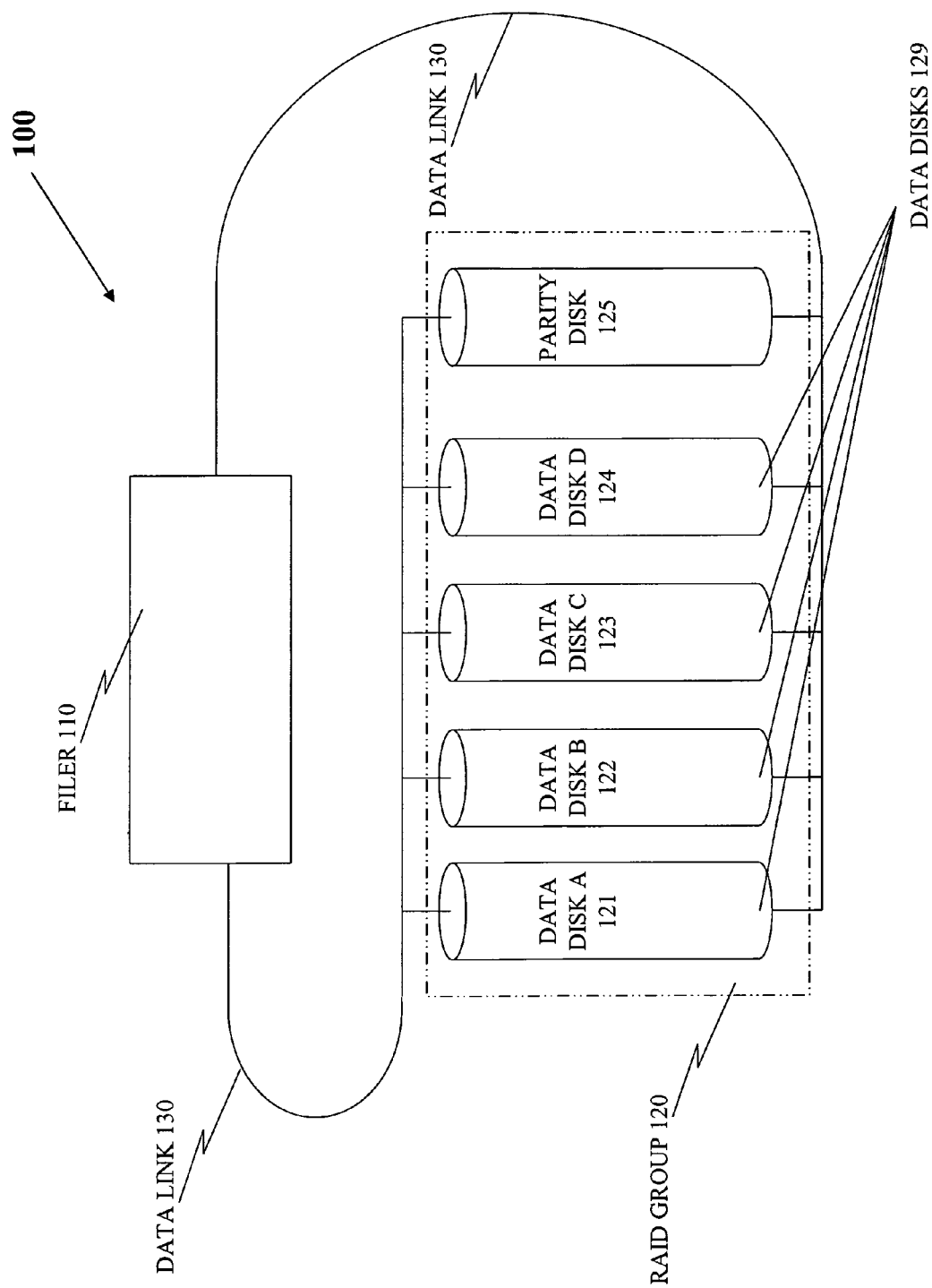
Fig. 1/4

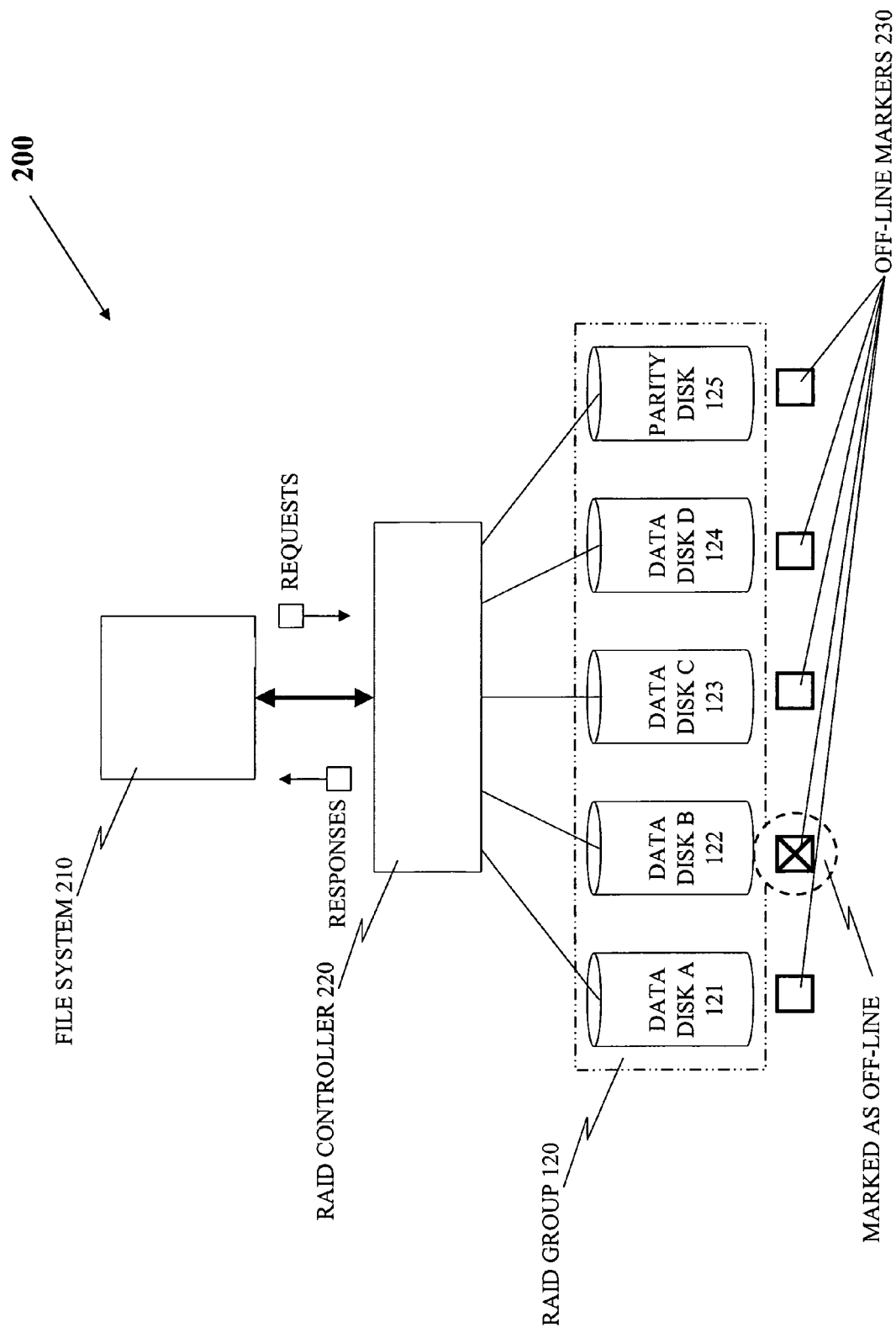

DISABLE A DISK
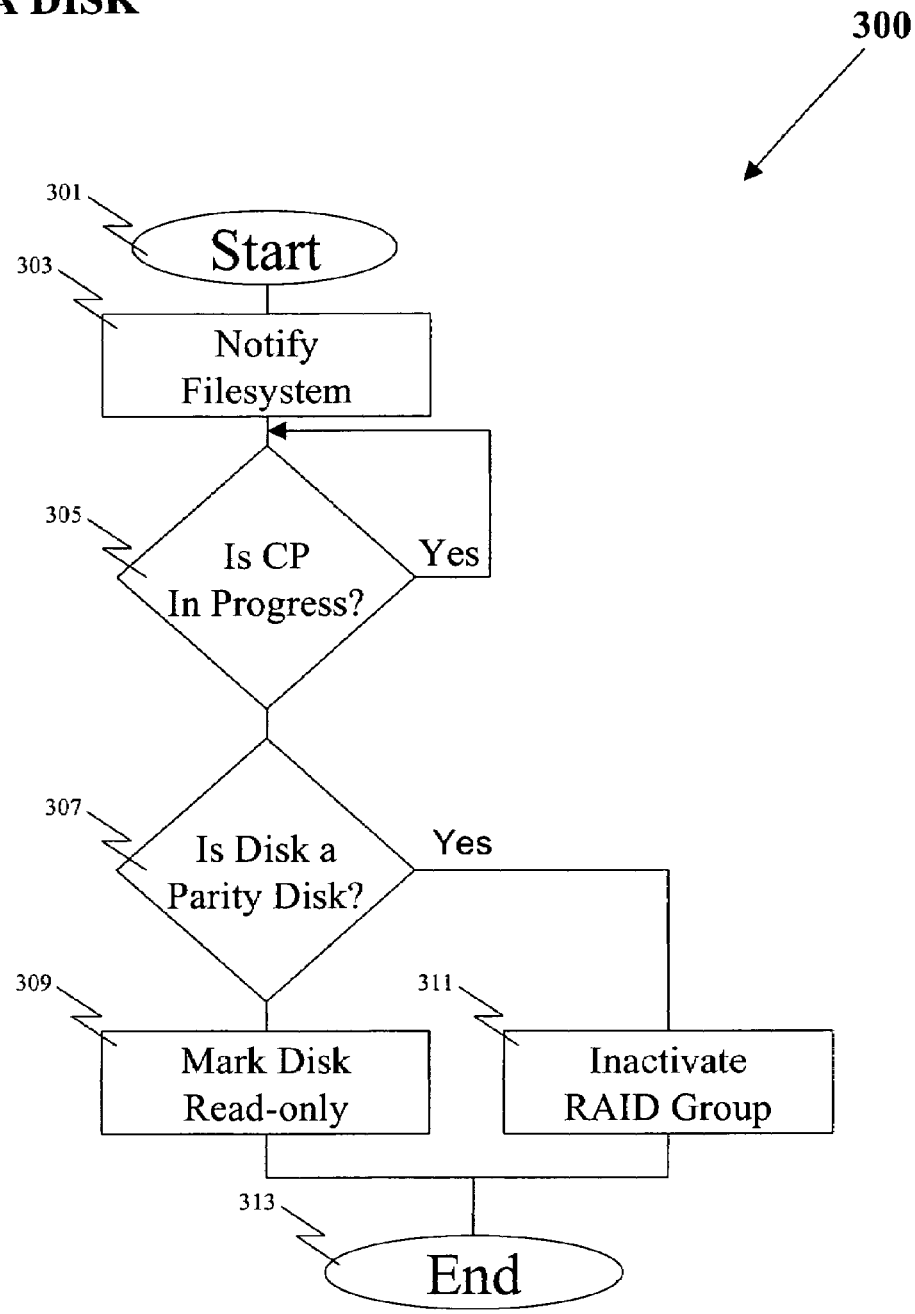
Fig. 3/4

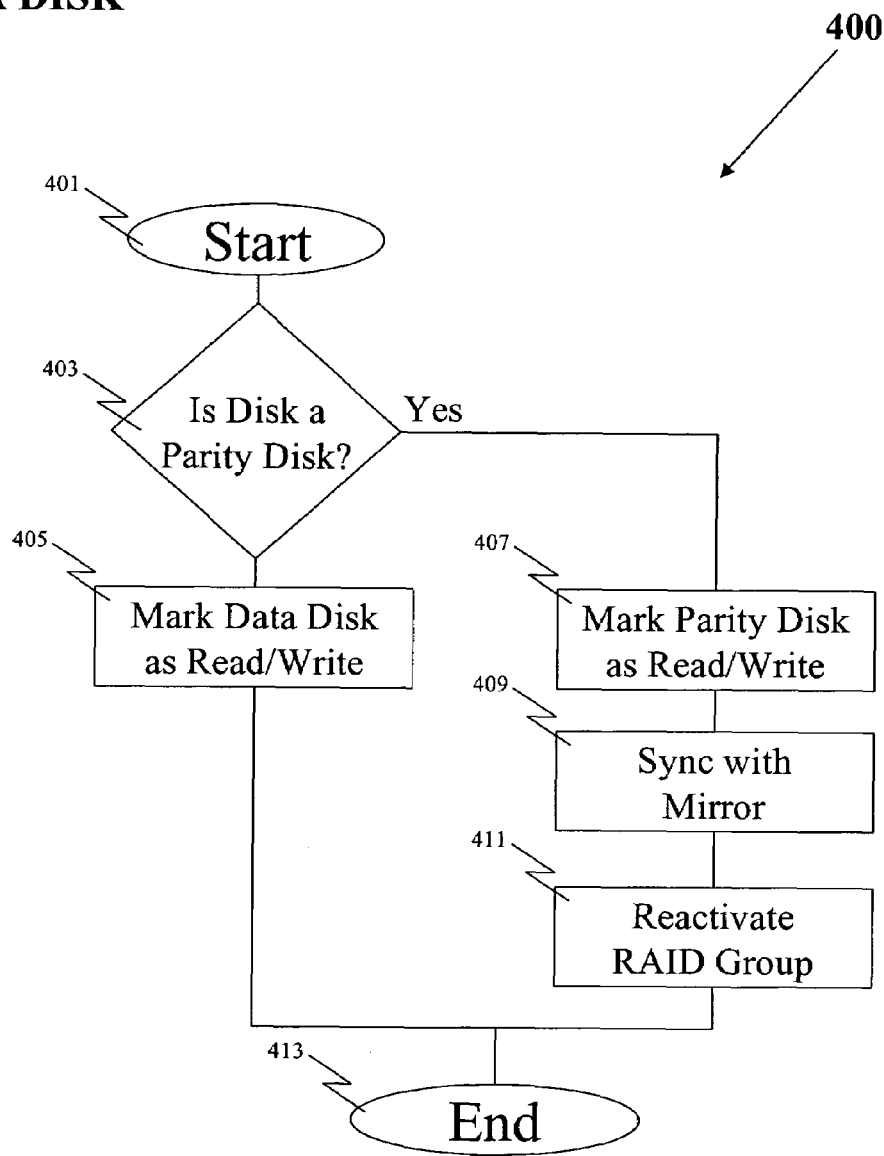

FLEXIBLE DISABLING OF DISK SETS

CROSS-REFERENCE TO RELATED APPLICATION

This application is a continuation and claims the benefit of U.S. patent application Ser. No. 10/084,405, filed Feb. 25, 2002, now issued as U.S. Pat. No. 6,836,820 B1.

INCORPORATED DISCLOSURE

The invention described herein can be used in conjunction with the invention described in the following application:

Application Ser. No. 08/071,643, filed in the name of David Hitz et. al., titled "Write Anywhere File-System Layout," Express Mailing number RB962032214US, filed Jun. 3, 1993.

BACKGROUND OF THE INVENTION

1. Field of the Invention

This invention relates to RAID subsystems.

2. Related Art

Redundant Array of Independent Disks (RAID) is a popular method for information storage. RAID comes in several configurations that offer advantages over using a single storage device (such as faster data transfers and an error recovery methodology).

At some point in the life of a RAID group there may be a desire to disable one or more disks in the system. RAID systems often start quite small and grow into large complex systems. As a RAID system grows, the location of its component parts can become fragmented. Location fragmentation can make administration and maintenance of a system troublesome when, for example, each disk in a RAID group is located in a different rack or a different room.

The obvious solution is to move all the components of a RAID group to one location, such as, a single rack. Generally, this requires taking the RAID or some portion of it off-line which is rarely an option.

A first known method that allows a disk to be disabled and then reactivated is often used to replace a damaged disk in a RAID group. This is often referred to as hot swapping or hot plugging. Although this method allows a disk to be inactivated and then reactivated, it suffers from a severe disadvantage. When the disk is reactivated, reconstruction of the RAID group data can take several hours, and if another disk in the group fails during this time the entire volume may be lost.

A second known method uses a change log to track any changes that take place relating to the inactivated disk in its absence. Although this method allows a disk to be inactivated and reactivated, it too suffers from a severe disadvantage. Tracking all the changes that need to be made to the inactivated disk is a very complex operation. The greater the duration between inactivation of a disk and its reactivation, the greater the likelihood that there will be more and more changes necessary. Thus, this technique has only limited value directed toward short term disabling of a disk in a RAID group.

Accordingly, it would be desirable to provide a technique for flexible disabling of disk sets that is not subject to the limitations of the known art.

SUMMARY OF THE INVENTION

The invention provides a method and system for flexible disabling of disk sets within a RAID group. In conjunction with the invention detailed in the incorporated disclosure (WAFL), the invention allows a disk to be disabled for long periods of time and then reactivated without incurring overhead (such as, required reconstruction of a RAID group).

Executing the following steps will allow a disk to be disabled. First, if WAFL is currently writing a consistency point, it should be allowed to complete the operation before continuing. Second, the disk to be inactivated is marked as "read-only." At this point, the disk can be physically removed and the data that would come from the inactivated disk is reconstructed using the remaining disks (reconstruct on read).

After a disk has been inactivated, writes continue to the RAID group using the remaining active disks in the group. Most file systems "write in place." This means that they overwrite old data with new data. WAFL always writes to unallocated file space. According to the invention, files that are edited during inactivation of a drive are written in their entirety to active disks, thus no data reconstruction is required when an inactivated disk is reactivated.

Executing the following steps will allow a disk to be reactivated. First, the disk must be physically connected. Second, the disk is marked as "read/write." At this point, the disk is operating as it was prior to being disabled.

A parity disk may be disabled in a similar fashion, however, the entire RAID group must be disabled and a mirror RAID group should be used as the read source. A RAID group cannot provide data reliably when its parity disk is inactive. When the disabled parity disk is reactivated, it must be resynchronized with its mirror before it is allowed to resume accepting requests for reading and writing data.

BRIEF DESCRIPTION OF THE DRAWINGS

FIG. 1 shows a block diagram of a system for flexible disabling of disk sets.

FIG. 2 shows a block diagram of data paths between components in a system for flexible disabling of disk sets.

FIG. 3 illustrates a process flow diagram for disk disabling in a method for flexible disabling of disk sets.

FIG. 4 illustrates a process flow diagram for disk enabling in a method for flexible disabling of disk sets.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

RAID—in general, short for Redundant Array of Independent (or Inexpensive) Disks, a category of disk drives that employ two or more drives in combination for fault tolerance and performance.

Disk Mirroring—in general, a technique in which data is written to two duplicate disks simultaneously. When using two RAID groups, data written to the first RAID group is also written to the second RAID group. The second RAID group is said to be a "mirror" of the first RAID group.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for flexible disabling of disk sets.

A system 100 includes a filer 110, a RAID group 120, and a data link 130.

The filer 110 includes a processor, a main memory, and software for executing instructions (not shown, but understood by one skilled in the art). This software preferably includes software for managing a RAID storage system according to the invention. Although the filer 110 and the RAID group 120 are shown as separate devices, there is no requirement that they be physically separate.

The RAID group 120 includes two or more data disks 129 and a parity disk 125. For example but without limitation, FIG. 1 illustrates four data disks 129 labeled data disk a 121, data disk b 122, data disk c 123, and data disk d 124. The parity disk 125 includes parity information related to each RAID stripe (not shown, but understood by one skilled in the art). RAID level 4 is used in a preferred embodiment; however, there is no requirement that RAID level 4 be used, and other levels of RAID may also be used. RAID level configurations are well-known in the art.

The RAID group 120 can include any one of a number of types of storage, including but not limited to, tape drives, hard disk drives, and optical drives. The RAID group 120 may also use these types of drives in various combinations.

The data link 130 couples the filer 110 to the RAID group 120.

In a preferred embodiment, the data link 130 includes a direct wired connection. In alternative embodiments, the data link 130 may include alternative forms of communication, such as the Internet, an intranet, extranet, virtual private network, wireless network, or some combination thereof.

System Operation

FIG. 2 shows a block diagram of data paths between components in a system for flexible disabling of disk sets.

A system 200 includes a file system 210, a RAID controller 220, and a set of off-line markers 230.

In a preferred embodiment, the file system 210 includes a WAFL file system as detailed in the incorporated disclosure.

The RAID controller 220 preferably includes a device capable of routing data to and from the RAID group 120 in accordance to RAID level 4.

The set of off-line markers 230 include a set of binary memory addresses. Each one of the set of off-line markers 230 is individually associated with a disk in the RAID group 120. A bit set for one of the set of off-line markers 230 indicates that the associated disk in the RAID group 120 is off-line.

Data disk b 122 and the parity disk 125 are used below to explain operation of the invention. This is intended to be exemplary and not limiting. The invention is applicable to any disk or combination of disks in a RAID group 120.

Normal Operation

Requests for data are sent by the file system 210 to the RAID controller 220 which fetches the data from, or sends data to the RAID group. Responses to requests are sent back to the file system 210.

Data Disk Disabling and Reactivation

A data disk, such as data disk b 122, may be temporarily disabled. In a preferred embodiment the file system 210 used is a file system 210 implementing WAFL. Upon being notified that data disk b 122 is to be taken off-line, WAFL ensures that if it is in the process of writing a consistency point, the consistency point is written before proceeding. Data disk b 122 may now be marked as being off-line. The bit is set in the off-line marker 230 associated with data disk b 122. At this point the data disk b 122 may be physically disconnected from the system.

When a data disk is marked as being off-line, the file system 210 recognizes the off-line disk as being read only. Thus, the file system 210 will not attempt to write any data to data disk b 122 since it is marked as off-line. The data for data disk b 122 is still available using a reconstruct on read technique, which is well-known in the art.

WAFL provides an important benefit over other file systems with regard to disk disabling. WAFL never overwrites existing data like other file systems that utilize "write in place." Thus, even when disks are reactivated, the file system 210 is guaranteed to be consistent. No catch-up time is needed such as would be required in systems that use "change logs" or reconstruct data on previously disabled disks using parity computation.

The data disk b 122 is reactivated by first ensuring that it is physically connected to the RAID group 120, and second, that its bit in its associated off-line marker 230 is cleared. Once this is accomplished, data disk b 122 has both read and write capability again.

Parity Disk Disabling and Reactivation

The parity disk 125 may be temporarily disabled, however, when a parity disk 125 is disabled, the entire RAID group 120 must be taken off-line. This means that the RAID group 120 cannot be used even as a read only source for the data. Data may be read from a mirror of the off-line RAID group 120.

The parity disk 125 is reactivated by first ensuring that the parity disk 125 is physically connected to the RAID group 120. Second, the bit in its associated off-line marker 230 is cleared. This makes the parity disk 125 writeable as well as readable. Third, the RAID group 120 must be synchronized with its mirror. Fourth, the RAID group 120 is reactivated and is now ready to accept requests.

Disk Disabling

FIG. 3 illustrates a process flow diagram for disk disabling in a method for flexible disabling of disk sets, indicated by general reference character 300. The disk disabling process 300 initiates at a 'start' terminal 301.

The disk disabling process 300 continues to a 'notify file system' procedure 303 which notifies the file system 210 that a systems operator or the system itself would like to disable a disk in the RAID group 120. For example, a systems operator may want to disable data disk b 122, and thus the file system 210 would be notified that a request has been made to disable the disk.

An 'is CP in progress?' decision procedure 305 determines if the file system 210 is currently creating a consistency point. If it is determined that the file system 210 is creating a consistency point, the disk disabling process 300 remains in the 'is CP in progress' decision procedure 305, otherwise the disk disabling process 300 continues to an 'is disk a parity disk' decision procedure 307.

The 'is disk a parity disk?' decision procedure 307 determines if the disk to be disabled is the parity disk 125. If it is determined that the disk to be disabled is the parity disk 125, the disk disabling process 300 continues to an 'inactivate RAID group' procedure 311.

A 'mark disk read-only' procedure 309 allows the disk to be marked as read only. This is accomplished by setting the bit for the associated off-line marker 230 for data disk b 122 (see FIG. 2 "marked as off-line). At this point the physical unit may be turned off and moved. Data that would be supplied by data disk b 122 if it were still active is still available by "reconstructing the data on read." That is, data from the remaining operational disks may be used to reconstruct data on the disabled data disk b 122. The disk disabling process 300 terminates through an 'end' terminal 313.

An 'inactivate RAID group' procedure 311 allows the RAID group 120 to be inactivated. The disk disabling process 300 terminates through the 'end' terminal 313. A RAID group 120 that has the parity disk 125 disabled cannot function. When the parity disk 125 is disabled, the file system 210 must look to a mirror of the disabled RAID group 120 for its data.

Disk Enabling

Prior to starting this process, the disk to be enabled must be physically connected to the RAID group 120.

FIG. 4 illustrates a process flow diagram for disk enabling in a method for flexible disabling of disk sets, indicated by general reference character 400. The disk enabling process 400 initiates at a 'start' terminal 401.

The disk enabling process 400 continues to an 'is disk a parity disk?' decision procedure 403 that determines whether the disk to be enabled is the parity disk 125. If it is determined that the disk to be enabled is the parity disk 125, then the disk enabling process 400 continues to a 'mark parity disk as read/write' procedure 407, otherwise the disk enabling process 400 continues to a 'mark data disk as read/write' procedure 405.

The 'mark data disk as read/write' procedure 405 allows the data disk b 122 to be marked as read/write. This is accomplished by clearing the bit for the off-line marker 230 associated with data disk b 122. At this point the data disk b 122 is fully operational as an integral part of the RAID group 120. The disk enabling process 400 terminates through an 'end' terminal 413.

The 'mark parity disk as read/write' procedure 407 allows the parity disk 125 to be marked as read/write. This is accomplished by clearing the bit for the off-line marker 230 associated with parity disk 125. At this point the parity disk is only available to the file system 210.

A 'sync with mirror' procedure 409 allows the previously disabled RAID group 120 to synchronize with its mirror. No public access is allowed to the RAID group 120 while synchronization is taking place.

A 'reactivate RAID group' procedure 411 allows the RAID group 120 to be reactivated. The disk enabling process 400 terminates through the 'end' terminal 413. At this point the RAID group 120 is available to users of the system.

Generality of the Invention

The invention has applicability and generality to other aspects of data storage on mass storage devices utilizing RAID including filers, caches, databases, and other memory storage systems.

Alternative Embodiments

Although preferred embodiments are disclosed herein, many variations are possible which remain within the concept, scope, and spirit of the invention, and these variations would become clear to those skilled in the art after perusal of this application.

The invention claimed is:

1. In a computer system having a file system that controls reads and writes to a set of disks in a RAID group, a method including identifying a parity disk requiring an operational status change, said operational status indicating said parity disk is either online or off-line;

responding, by said file system, to said identification by marking said parity disk in said RAID group to indicate said operational status;

controlling said entire RAID group's operational status responsive to said marking; and recording said operational status in one of a set of off-line markers, each said marker associated with at least one bit in a binary address.

2. In a storage system including a RAID array, a method including identifying a data disk in the RAID array requiring an operational status change;

determining a time when said operational status change can be made to said data disk;

marking said data disk to indicate said operational status change; and recording said operational status in one of a set of off-line markers, each said marker associated with at least one bit in a binary address.

3. In a storage system including a RAID array, a method including identifying a parity disk in the RAID array requiring an operational status change;

determining a time when said operational status change can be made to said parity disk;

marking said parity disk to indicate said operational status change; and recording said operational status in one of a set of off-line markers, each said marker associated with at least one bit in a binary address.

4. The method of claim 3, wherein the entire said RAID array is disabled responsive to said recording.

5. The method of claim 3, wherein the entire said RAID array is enabled responsive to said recording.

6. A storage system having a sub-system that controls reads and writes to a RAID array, said sub-system including a memory and a processor, wherein said memory includes an instruction for identifying at least one data disk in the RAID array requiring an operational status change;

an instruction for determining a time for effecting said operational status change of said at least one data disk;

an instruction for marking said at least one data disk to indicate said operational status change;

an instruction for recording said operational status change in at least one of a set of off-line markers, each said marker associated with at least one bit in a binary address and at least one data disk in the RAID array.

7. A storage system having a sub-system that controls reads and writes to a RAID array, said sub-system including a memory and a processor, wherein said memory includes
an instruction for identifying at least one parity disk in the RAID array requiring an operational status change;
an instruction for determining a time for effecting said operational status change of said at least one parity disk;
an instruction for marking said at least one parity disk to indicate said operational status change;
an instruction for recording said operational status change in at least one of a set of off-line markers, each said marker associated with at least one bit in a binary address and at least one parity disk in the RAID array.

8. The storage system of claim 7, wherein the entire said RAID array is disabled responsive to said instruction for recording.

9. The storage system of claim 7, wherein the entire said RAID array is enabled responsive to said instruction for recording.

10. A method comprising:
identifying, in a storage redundancy group, a storage device requiring an operational status change;
waiting until said operational status change can be made to said storage device;
marking said storage device to indicate said operational status change; and
recording said operational status in one of a set of off-line markers, each said marker associated with at least one bit in a binary address.

11. The method of claim 10, wherein the storage redundancy group comprises a RAID array and the storage device comprises a disk in the RAID array.

12. The method of claim 11, wherein the disk comprises a data disk.

13. The method of claim 11, wherein the disk comprises a parity disk.

14. The method of claim 13 further comprising changing the entire RAID array's operational status.

* * * * *